(12) United States Patent
Bass, Jr.

(10) Patent No.: US 9,497,949 B1
(45) Date of Patent: Nov. 22, 2016

(54) FISHING BRAKES

(71) Applicant: James E. Bass, Jr., Shreveport, LA (US)

(72) Inventor: James E. Bass, Jr., Shreveport, LA (US)

( * ) Notice: Subject to any disclaimer, the term of this patent is extended or adjusted under 35 U.S.C. 154(b) by 0 days.

(21) Appl. No.: 14/856,746

(22) Filed: Sep. 17, 2015

Related U.S. Application Data

(60) Provisional application No. 62/071,230, filed on Sep. 18, 2014.

(51) Int. Cl.
*A01K 91/00* (2006.01)
*A01K 93/00* (2006.01)

(52) U.S. Cl.
CPC .................... *A01K 93/00* (2013.01)

(58) Field of Classification Search
USPC ................................. 43/44.9, 43.1
See application file for complete search history.

(56) References Cited

U.S. PATENT DOCUMENTS

| | | | | |
|---|---|---|---|---|
| 2,292,743 A * | 8/1942 | Cordry | A01K 91/02 43/41 |
| 2,799,114 A * | 7/1957 | Turner | A01K 93/00 43/43.11 |
| 4,139,964 A * | 2/1979 | Pelletier | A01K 91/06 43/42.19 |
| 4,757,635 A * | 7/1988 | Cole | A01K 93/00 43/17.5 |
| 5,048,219 A * | 9/1991 | Georgescu | A01K 93/00 43/17 |
| 5,351,434 A * | 10/1994 | Krenn | A01K 95/00 43/43.12 |
| 6,874,271 B2 * | 4/2005 | Lieb | A01K 93/00 43/43.13 |
| 6,993,866 B1 * | 2/2006 | Strange | A01K 85/12 43/42.31 |
| 7,797,877 B1 * | 9/2010 | Bennis | A01K 91/03 43/44.86 |
| 7,913,445 B2 * | 3/2011 | St. Germain | A01K 93/00 43/42.22 |
| 8,943,738 B2 * | 2/2015 | Parcell | A01K 85/02 43/42.4 |
| 9,265,240 B2 * | 2/2016 | Kavanaugh | A01K 93/00 |
| 2012/0131843 A1 * | 5/2012 | Peak | A01K 93/00 43/44.9 |

* cited by examiner

*Primary Examiner* — Christopher P Ellis
(74) *Attorney, Agent, or Firm* — R. Keith Harrison

(57) ABSTRACT

A fishing brake for a fishing line includes a generally concave fishing brake body having a brake interior and a brake mouth communicating with the brake interior and a buoyant flotation portion carried by the fishing brake body.

17 Claims, 9 Drawing Sheets

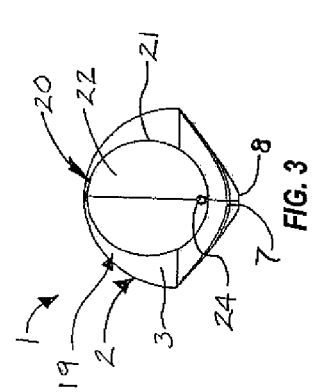
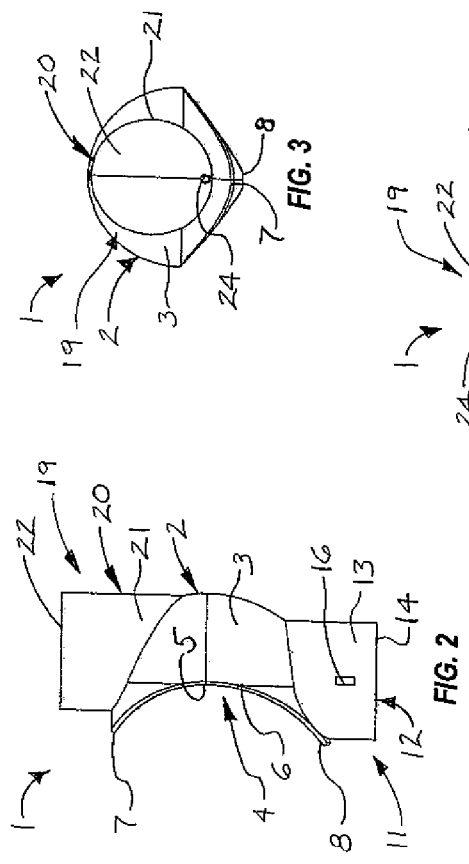
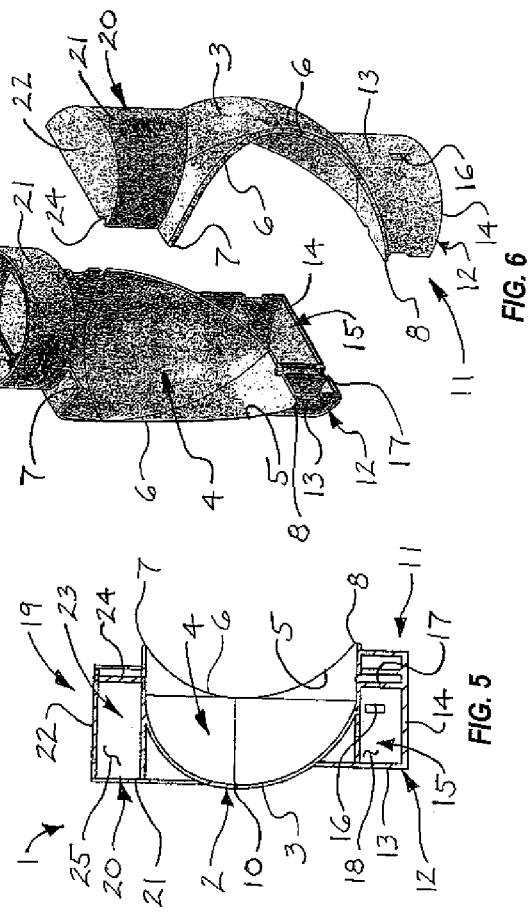
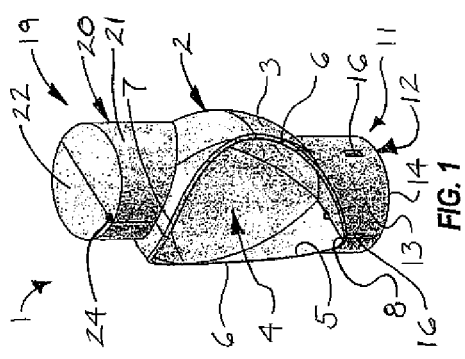
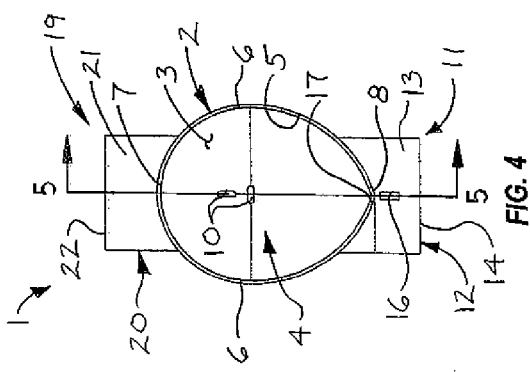

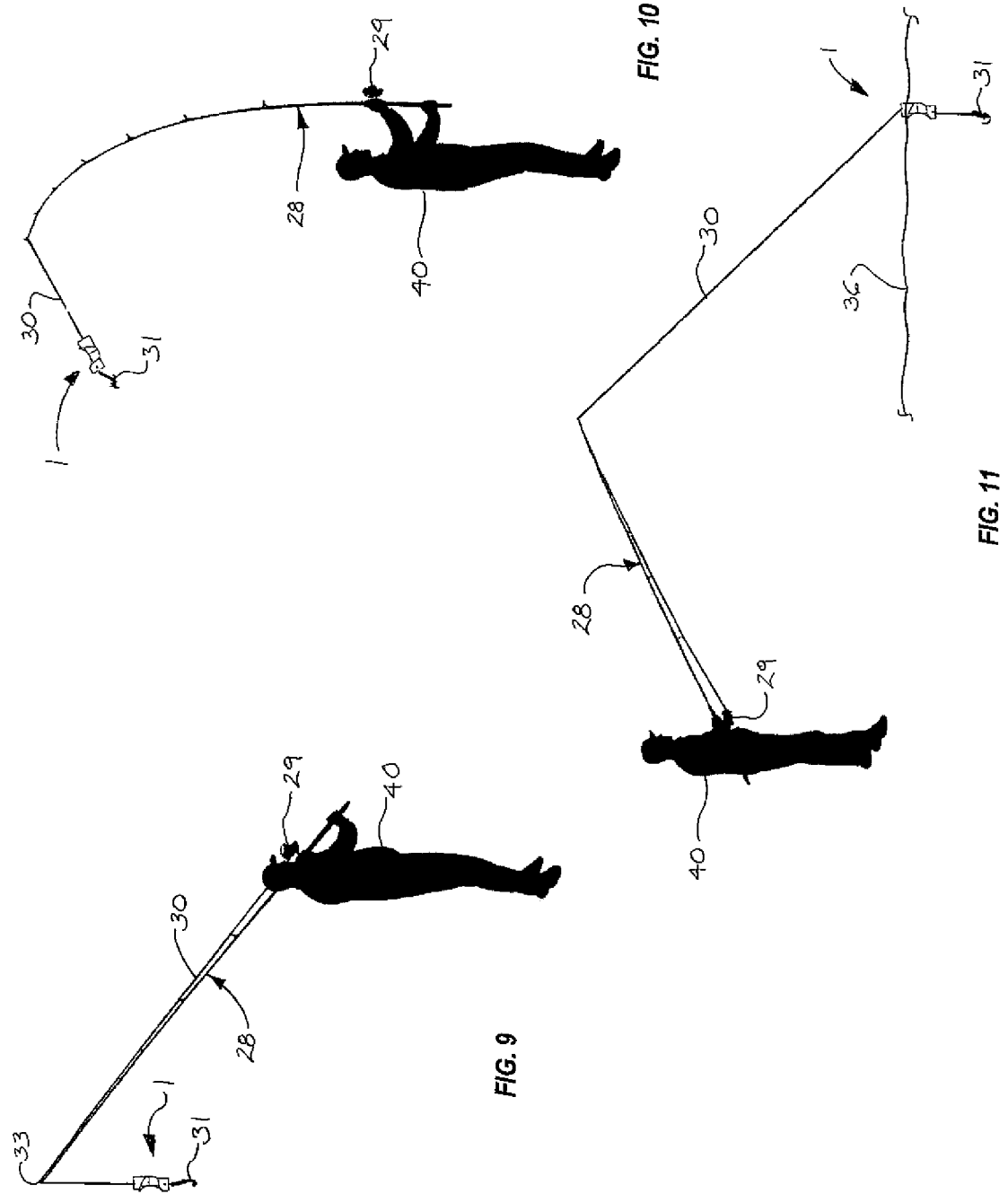

US 9,497,949 B1

FISHING BRAKES

CROSS-REFERENCE TO RELATED APPLICATIONS

This application claims the benefit of U.S. provisional application No. 62/071,230, filed Sep. 18, 2014 and entitled FISHING BRAKE, which provisional application is hereby incorporated by reference herein in its entirety.

FIELD

Illustrative embodiments of the disclosure generally relate to fishing accessories. More particularly, illustrative embodiments of the disclosure relate to fishing brakes which enable a fisher to adjust the position of a casted fishing lure to a selected fishing location on a water body and control the position of the submerged fishing lure along a vertical axis at the selected fishing location while significantly retarding movement of the lure toward the fisher.

BACKGROUND

The background description provided herein is solely for the purpose of generally presenting the context of the illustrative embodiments of the disclosure. Aspects of the background description are neither expressly nor impliedly admitted as prior art against the claimed subject matter.

Since the advent of the rod and reel, fishers have continued to search for ways to present their lures or bait (hereinafter "lure") to fish which they perceive to be located in a certain area in a water body. A typical rod and reel utilizes a fishing line wound on a reel, which is mounted on the handle of an elongated, flexible fishing rod. The lure terminates the fishing line with one or more hooks. The lure is cast to a selected fishing location on the surface of the water body which overlies an area or fish strike zone in which the fish are believed to be present by tossing the rod tip of the rod after disengaging the reel, and then re-engaging the reel when the lure enters the water body at the selected fishing location. After casting, the fisher may let the lure sink and settle on the bottom of the water body, or alternatively, may reel the line or twitch the rod tip to impart a simulated swimming motion to the lure.

A fisher typically stands or sits in a boat or on land as the cast is made to the selected fishing location on the water body. Due to the difficulty in precisely casting and targeting the lure, however, the fisher may not be able to fish the selected fishing location. Even in the event that he or she is fortunate enough to cast the lure to the fishing location, the fisher may have a very limited time in which to present the lure to the fish since the lure quickly moves through the fish strike zone toward the fisher as it falls in the water body. Thus, the fisher may be required to first cast the lure beyond the fishing location and then adjust the position of the lure to the location by moving the tip of the fishing rod. Then, the fisher typically must operate the reel to remove slack from the fishing line. Consequently, these actions move the lure toward the fisher. Fish typically only swim a short distance to strike a lure, and this distance may change depending on water and weather conditions. Therefore, each time the fisher moves the rod tip in an effort to adjust the position of the lure to the fishing location and reels the fishing line to take up slack in the line, the lure quickly moves toward the fisher and out of the strike zone of the fish.

Accordingly, fishing brakes which enable a fisher to adjust the position of a casted fishing lure to a selected fishing location on a water body and control the position of the submerged fishing lure along a vertical axis at the selected fishing location while significantly retarding movement of the lure toward the fisher are needed.

SUMMARY

Illustrative embodiments of the disclosure generally relate to a fishing brake for a fishing line. An illustrative embodiment of the fishing brake includes a generally concave fishing brake body having a brake interior and a brake mouth communicating with the brake interior and a buoyant flotation portion carried by the fishing brake body.

BRIEF DESCRIPTION OF THE DRAWINGS

Illustrative embodiments of the disclosure will now be described, by way of example, with reference to the accompanying drawings, in which:

FIG. 1 is a front perspective view of an illustrative embodiment of the fishing brakes;

FIG. 2 is a left side view of the fishing brake illustrated in FIG. 1;

FIG. 3 is a top view of the fishing brake;

FIG. 4 is a front view of the fishing brake;

FIG. 5 is a longitudinal sectional view, taken along section lines 5-5 in FIG. 4, of the fishing brake;

FIG. 6 is an exploded front perspective view of the fishing brake;

FIGS. 9-11 illustrate a typical casting sequence in application of the fishing brake;

DETAILED DESCRIPTION

Figure 12:
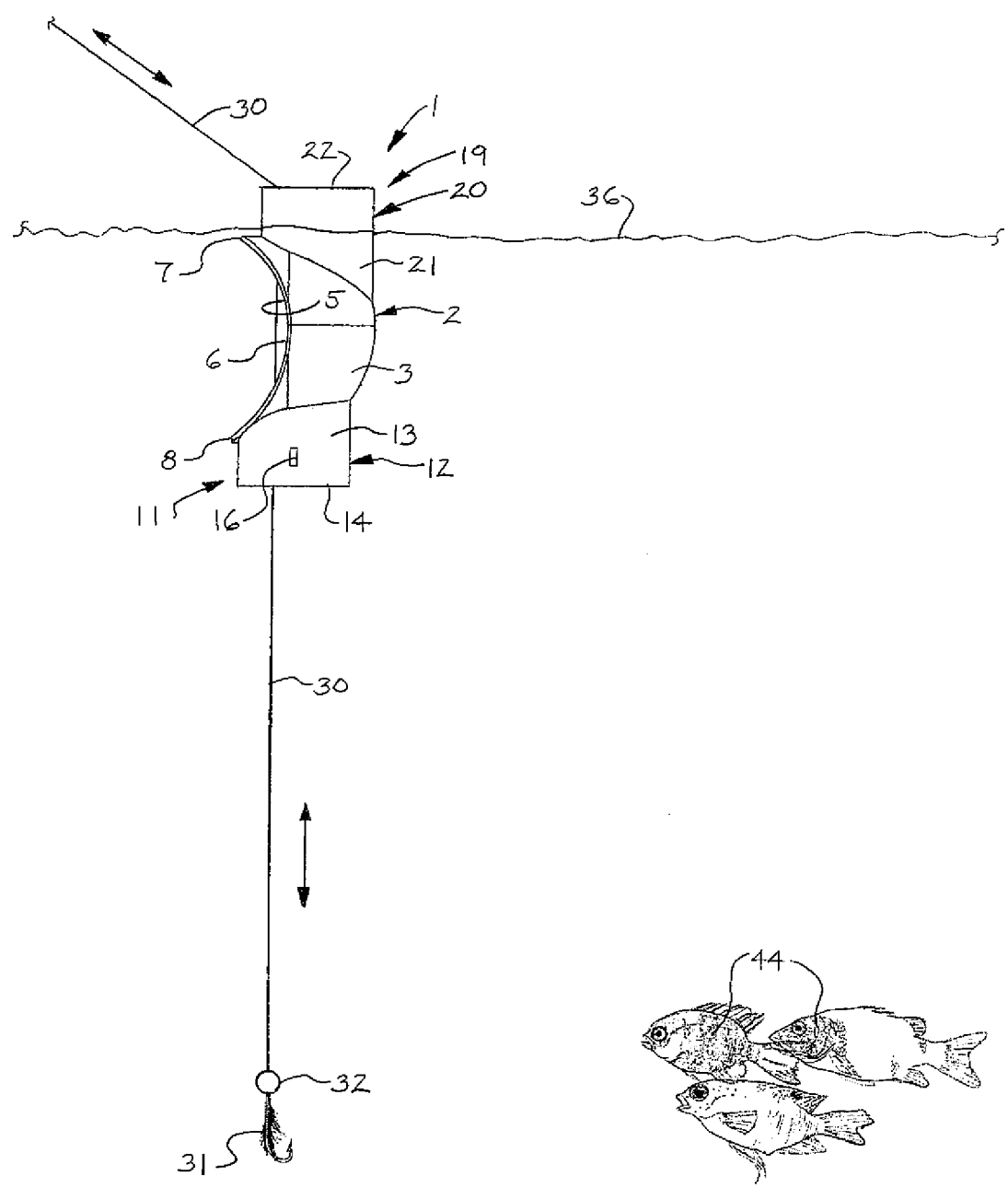
FIG. 12 is a side view of the fishing brake deployed in a body of water, with the fishing line extending through the fishing brake and more particularly illustrating vertical adjustment of the fishing line and a fishing lure attached to the fishing line to adjust the vertical position or depth of the fishing lure in the water body.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. Relative terms such as "front", "rear", "upper", "side" and "lower" are used in aid in an understanding of the illustrative embodiments of the methods and are not intended to be construed in a limiting sense. For purposes of illustration, these relative terms shall relate to the position of the fishing brake in its normal upright functional position as illustrated in FIG. 12. However, it will be recognized and understood by those skilled in the art that during its use and in other embodiments the fishing brakes may be positioned in other orientations in which these relative terms do not apply.

Referring initially to FIGS. 9-12 of the drawings, an illustrative embodiment of the fishing brake is generally illustrated by reference numeral 1. In typical application, which will be hereinafter further described in detail, the fishing brake 1 is placed on a fishing line 30 which may be wound on a reel 29 provided on a fishing rod 28, as illustrated in FIGS. 9-11. A fishing lure and at least one hook 31 are tied or otherwise attached to the extending end of the fishing line 30 typically in the conventional manner. After a fisher 40 casts the fishing lure 31 into a water body 36, as further illustrated in FIGS. 9-11, the fishing brake 1 floats in the water body 36. After the cast, the fisher 40 may desire to adjust the position of the fishing lure 31 to a desired fishing location which corresponds to a suspected fish strike zone within the water body 36, typically by movement of the rod tip 33 on the fishing rod 28. Thus, the fishing brake 1 imparts significant drag to the fishing line 30 as the fishing line 30 pulls the fishing lure 31 toward the fisher 40, increasing the time during which the fishing lure 31 enters and remains within the fish strike zone. As illustrated in FIG. 12, the fishing brake 1 further allows the fisher 40 to bi-directionally move the fishing lure 31 vertically within the water body 36, typically by movement of the rod tip 33 of the fishing rod 28, to impart a lifelike simulated swimming motion to the fishing lure 31 and/or to adjust the vertical position of the fishing lure 31 within the water body 36 for optimum placement of the fishing lure 31 within the fish strike zone.

During the vertical movement of the fishing line 30 through the fishing brake 1, the fishing line 30 typically inadvertently pulls the fishing lure 31 toward the fisher 40. Accordingly, the fishing brake 1 imparts significant drag to the fishing line 30 to slow travel of the fishing lure 31 through the fish strike zone and increase the time during which the fishing lure 31 is presented to fish 44 within the fish strike zone.

Figure 7:
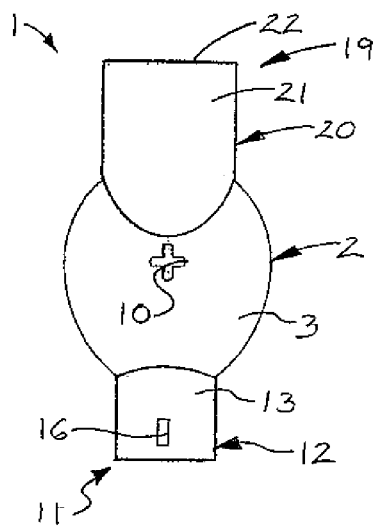
FIG. 7 is a rear view of the fishing brake.

Referring next to FIGS. 1-8 of the drawings, in some embodiments, the fishing brake 1 may be particularly adapted for fishing lures 31 (FIG. 12) with a fishing weight 32 having a weight of from about 7/16 oz. to about 1 oz. In various other embodiments, which will be hereinafter described, the fishing brakes may be fabricated to be used with heavier fishing weights 32. The fishing brake 1 includes a fishing brake body 2. In some embodiments, the fishing brake body 2 may be fabricated of a lightweight plastic material using conventional molding and/or other fabrication techniques known by those skilled in the art. The fishing brake body 2 may be generally concave or hemispherical in shape with a cup-shaped brake body wall 3 which forms a brake interior 4. The brake body wall 3 may have a brake mouth 5 which forms an exterior opening that communicates with the brake interior 4. As particularly illustrated in FIGS. 1 and 4, in some embodiments, the brake mouth 5 may have a pair of generally curved side mouth edges 6 and an upper mouth edge 7 and a lower mouth edge 8 which extend between the side mouth edges 6. In some embodiments, the brake mouth 5 may be generally elongated and the lower mouth edge 8 may be generally tapered in front view, as particularly illustrated in FIG. 4. In other embodiments, the brake mouth 5 may be circular, oval or elliptical in shape with a curved and non-tapered lower mouth edge 8. As illustrated in FIGS. 4 and 7, at least one brake body water opening 10 may extend through the brake body wall 3, typically at the rear portion of the fishing brake body 2, for purposes which will be hereinafter described.

A buoyant flotation portion 19 is provided on the fishing brake body 2. The flotation portion 19 may include any structure and/or material which is buoyant in water. In some embodiments, the flotation portion 19 may include a buoyant flotation chamber 20 which extends upwardly from the fishing brake body 2. The flotation chamber 20 may include a flotation chamber side wall 21 which extends from the fishing brake body wall 3 of the fishing brake body 2. In some embodiments, the flotation chamber side wall 21 may be generally cylindrical in shape, as illustrated. A flotation chamber end wall 22 may close the upper end of the flotation side wall 21. As illustrated in FIG. 5, the flotation chamber 20 has a flotation chamber interior 23 which may be filled with a buoyant medium 25. In some embodiments, the buoyant medium 25 may include air. In some embodiments, the buoyant medium 25 may include STYROFOAM (trademark), a cork material and/or other physical material which is buoyant in water. A flotation portion fishing line opening 24 may extend through the flotation chamber 20 in communication with the brake interior 4 of the fishing brake body 2 for purposes which will be hereinafter described.

A non-buoyant weighted portion 11 is provided on the fishing brake body 2. The weighted portion 11 may include any structure and/or material which imparts weight to the fishing brake 1 in water. In some embodiments, the weighted portion 11 may include a weighted chamber 12 which is provided on the fishing brake body 2. In some embodiments, the weighted chamber 12 may extend downwardly from the fishing brake body 2, as illustrated. The weighted chamber 12 may have a weighted chamber side wall 13 which extends from the brake body wall 3 of the fishing brake body 2. In some embodiments, the weighted chamber side wall 13 may be generally cylindrical in shape, as illustrated. A weighted chamber end wall 14 may close the lower end of the weighted chamber side wall 13. As illustrated in FIGS. 5 and 6, the weighted chamber 12 has a weighted chamber interior 15. A weighted medium 18 is provided in the weighted chamber interior 15. In some embodiments, the weighted medium 18 may include lead and/or other material. In some embodiments, the weighted medium 18 may include water. Accordingly, at least one weighted chamber water opening 16 may extend through the weighted chamber side wall 13 of the weighted chamber 12 in communication with the weighted chamber interior 15. Thus, in application of the fishing brake 1, water may flow from the water body 36 (FIG. 12) into the weighted chamber interior 15 through the weighted chamber water opening 16 to impart weight to the fishing brake 1 as will be hereinafter described. A weighted portion fishing line opening 17 may extend through the weighted chamber 12 in communication with the brake interior 4 for purposes which will be hereinafter described. The weighted portion fishing line opening 17 is disposed in alignment or registration with the flotation portion fishing line opening 24 in the flotation chamber 20 through the brake interior 4 of the fishing brake body 2. As illustrated in FIGS. 2 and 5, in some embodiments, the upper mouth edge 7 of the brake mouth 5 may extend beyond the flotation chamber side wall 21 of the flotation chamber 20 and the lower mouth edge 8 of the brake mouth 6 may protrude beyond the weighted chamber side wall 13 of the weighted chamber 12.

Figure 8:
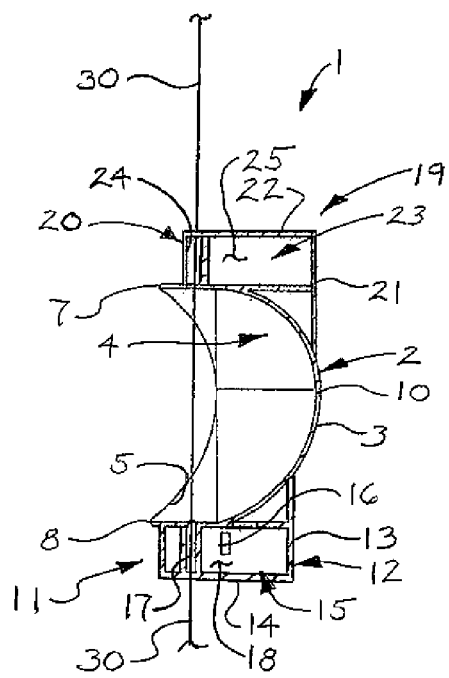
FIG. 8 is a sectional view of the fishing brake with a fishing line extending through the fishing brake and the fishing brake floating in an upright position in a water body in typical application thereof.

Referring next to FIGS. 8-14 of the drawings, in typical application, the fishing brake 1 is placed on a fishing line 30 which may be wound on a reel 29 provided on a fishing rod 28, as illustrated in FIGS. 9-11. Accordingly, the fishing line 30 may be partially unwound from the reel 29 and extended from the rod tip 33 of the fishing rod 28. As illustrated in FIG. 8, the fishing line 30 is extended through the flotation portion fishing line opening 24 in the flotation chamber 20, the brake interior 4 of the fishing brake body 2 and the registering weighted portion fishing line opening 17 in the weighted chamber 12, respectively. A fishing lure and at least one hook 31 may be tied on or otherwise attached to the end of the fishing line 30 typically in the conventional manner. In some applications, a fishing weight 32 (FIG. 12) may be provided on the fishing line 30 typically above the fishing lure 31.

As illustrated in FIG. 9, preparatory to casting the fishing lure 31, a fisher 40 holds the fishing rod 28 and initially disengages the reel 29 to release the fishing line 30 from the reel 29. A short segment of the fishing line 30 unwinds from the reel 29 and extends from the rod tip 33 typically under the weight of the fishing lure 31, the weight 32 and the fishing brake 1. The fisher 40 extends the fishing rod 28 in a rearward position over the fisher's shoulder, as illustrated in FIG. 9. Accordingly, the fishing brake 1 may be disposed in an upright vertical orientation behind the fisher 40 and just above the fishing lure 31.

As illustrated in FIGS. 10 and 11, the fisher 40 casts the fishing lure 31 by tossing the rod tip 33 of the fishing rod 28 forwardly over the fisher's shoulder, typically in the conventional manner. Thus, the forward-moving fishing lure 31, the fishing weight 32 and the fishing brake 1 pull and unwind the fishing line 30 from the reel 29. As the fishing lure 31 enters the water body 36 at a distance in front of the fisher 40, as illustrated in FIG. 11, the fisher 40 typically re-engages the reel 29 to secure the fishing line 30.

The fishing brake 1 enters the water body 36, as illustrated in FIG. 12, and may assume a vertical orientation with the brake mouth 5 of the fishing brake body 2 facing the fisher 40. Water flows from the water body 36 through the brake mouth 5 and the brake body water opening or openings 10 (FIGS. 4 and 7) into the brake interior 4 of the fishing brake body 2 and through the weighted chamber water opening or openings 16 into the weighted chamber interior 15 of the weighted chamber 12 to impart weight to the weighted chamber 12. Thus, the fishing brake 1 typically floats in the upright vertical orientation with the fishing brake body 2 and the weighted chamber 12 typically submerged beneath the surface of the water body 36. The air in the flotation chamber interior 23 (FIG. 5) of the flotation chamber 20 imparts buoyancy to the fishing brake 1 such that the flotation chamber end wall 22 and the upper portion of the flotation chamber 20 typically remain above the surface of the water body 36.

As was heretofore described with respect to FIG. 8, the fishing line 30 extends vertically through the fishing brake 1. Accordingly, typically by moving the rod tip 33 of the fishing rod 28, the fisher 40 can pull the fishing line 30 upwardly through the fishing brake 1, or alternatively, drop the fishing line 30 through the fishing brake 1 under the falling influence of the fishing lure 31 and the weight 32, as illustrated in FIG. 12. Therefore, the fishing lure 31 can be placed at any desired vertical position within the strike zone of fish 44 within the water body 36. In some applications, the fisher 40 may repeatedly raise and lower the rod tip 33 of the fishing rod 28 to impart a lifelike vertical swimming motion to the fishing lure 31 within the water body 36 and attract the attention of the fish 44 in the fish strike zone. It will be appreciated by those skilled in the art that the brake interior 4 and the brake mouth 5 of the fishing brake body 2 face the fisher 40 and create substantial horizontal drag which opposes movement of the fishing lure 31 toward the fisher 40 as the fishing line 30 moves vertically through the fishing brake 1. Therefore, the fishing brake 1 tends to maintain the fishing lure 31 within the fish strike zone in the water body 36 for a prolonged period of time to increase the likelihood that a fish 44 within the fish strike zone will strike the fishing lure 31. In the event that a fish 44 strikes the fishing lure 31, the fisher 40 may operate the reel 29 on the fishing rod 28 to reel in the fish 44 as the fishing brake 1 rides toward the fishing rod 28 on the fishing line 30. After the fish 44 is removed from the fishing lure 31, another cast may be made and the process repeated.

Figure 13:
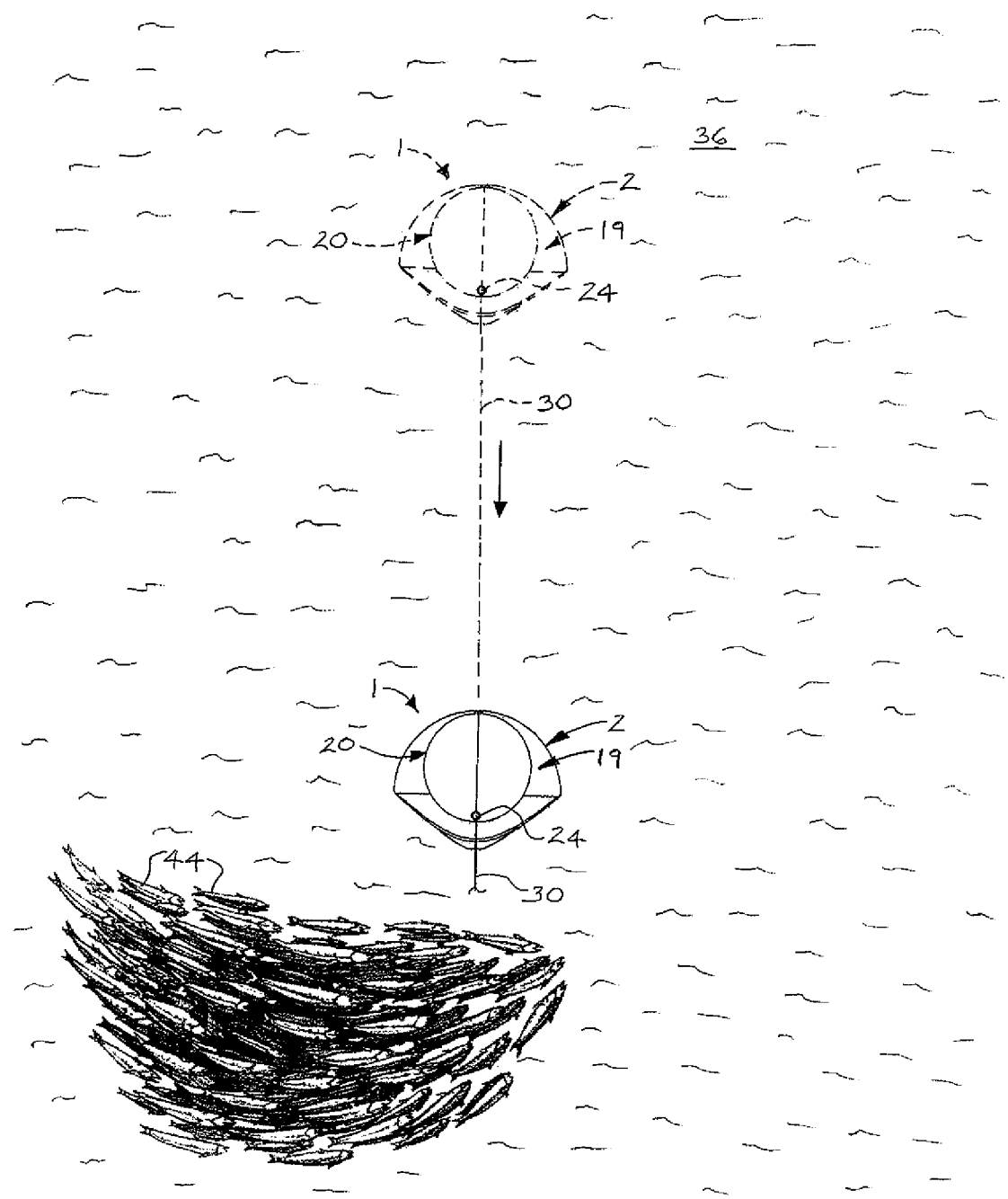
FIG. 13 is a top view of a water body, more particularly illustrating horizontal re-positioning of the fishing brake on the water body to adjust the position of the fishing lure from a casting location to a selected fishing location disposed in closer proximity to a school of fish.
Figure 14:
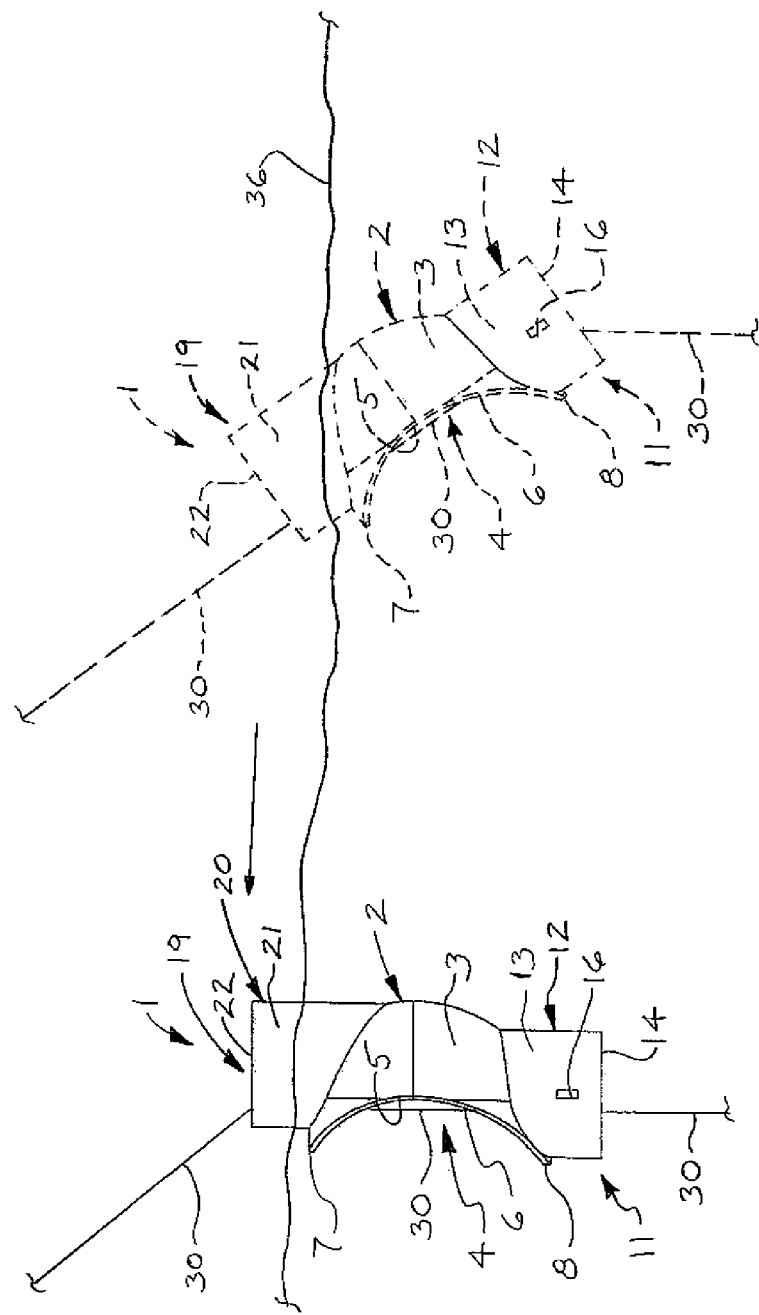
FIG. 14 is a side view illustrating typical braking action of the fishing brake in the water body as the position of the fishing lure is adjusted from the casting location to the selected fishing location in the water body.
Figure 17:
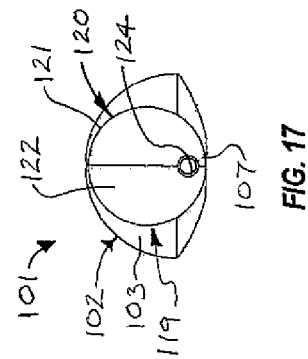
FIG. 17 is a top view of the fishing brake illustrated in FIG. 15.
Figure 16:
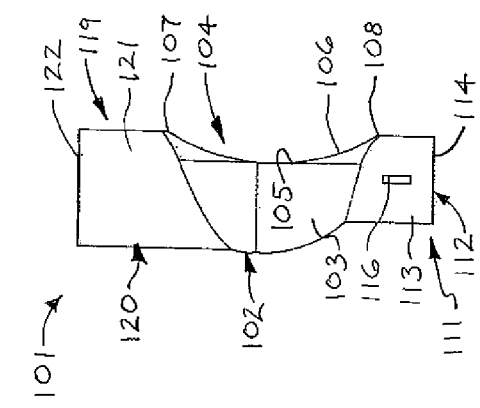
FIG. 16 is a right side view of the fishing brake illustrated in FIG. 15.
Figure 15:
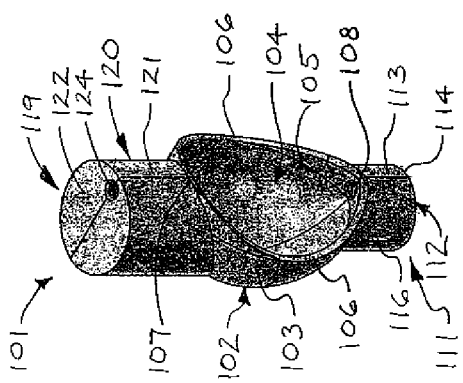
FIG. 15 is a front perspective view of an alternative illustrative embodiment of the fishing brake.
Figure 20:
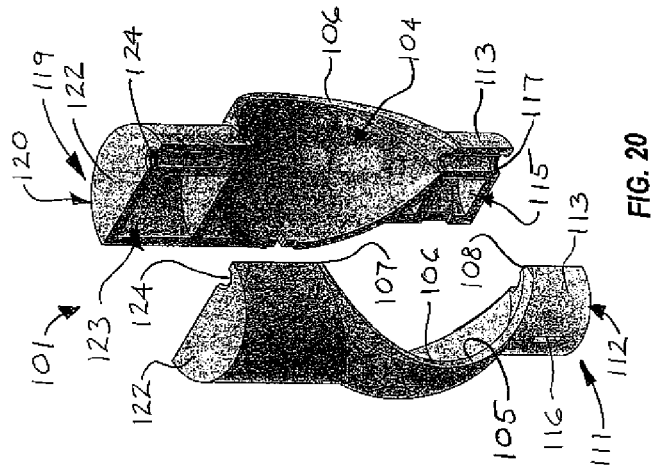
FIG. 20 is an exploded front perspective view of the fishing brake illustrated in FIG. 15.
Figure 19:
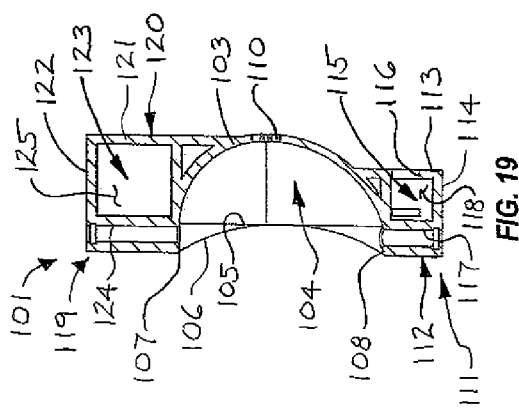
FIG. 19 is a longitudinal sectional view of the fishing brake, taken along section lines 19-19 in FIG. 18.
Figure 18:
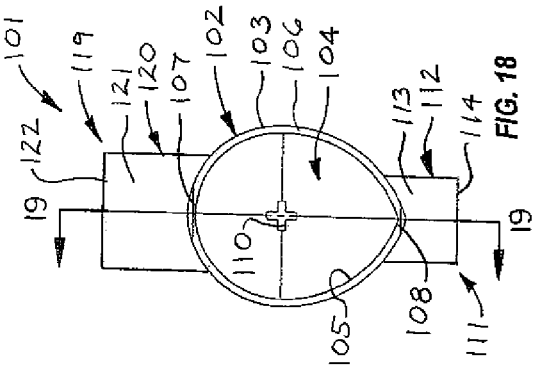
FIG. 18 is a front view of the fishing brake illustrated in FIG. 15.
Figure 22:
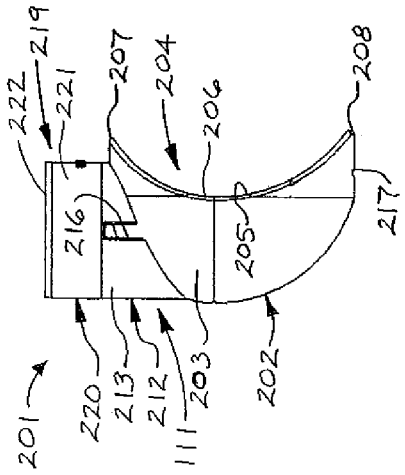
FIG. 22 is a right side view of the fishing brake illustrated in FIG. 21 in an assembled configuration.
Figure 24:
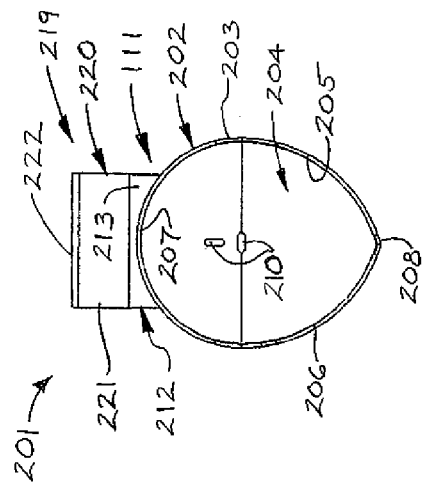
FIG. 24 is a front view of the assembled fishing brake illustrated in FIG. 22.
Figure 21:
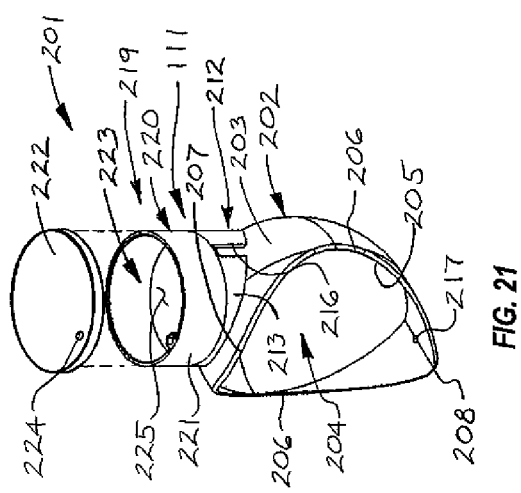
FIG. 21 is an exploded front perspective view of still another illustrative embodiment of the fishing brake.
Figure 23:
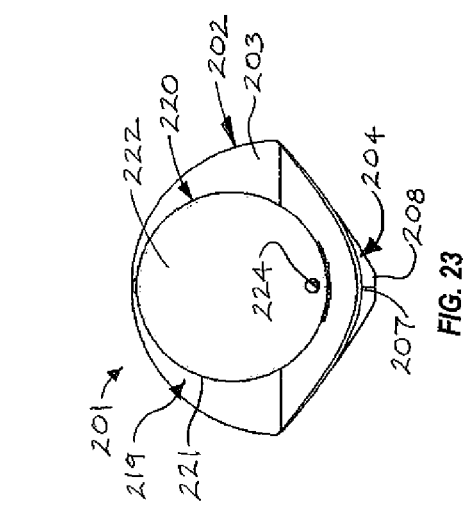
FIG. 23 is a top view of the assembled fishing brake illustrated in FIG. 22.

It will be appreciated by those skilled in the art that the fisher 40 can initially cast the fishing brake 1 and the fishing lure 31 beyond the desired fishing location on the water body 36 and then pull the fishing brake 1 and the fishing lure 31 toward the fisher 40 to the fishing location, as illustrated in FIGS. 13 and 14, typically by movement of the rod tip 33 of the fishing rod 28, in order to target the fish strike zone which contains the fish 44, as illustrated in FIGS. 12 and 13. Accordingly, the fishing brake 1 imparts substantial drag to the fishing line 30 and slows travel of the fishing lure 31 into and through the fish strike zone, prolonging the time during which the fishing lure 31 is presented to the fish 44.

Referring next to FIGS. 15-20 of the drawings, another illustrative embodiment of the fishing brake is generally indicated by reference numeral 101. In the fishing brake 101 illustrated in FIGS. 15-20, components which correspond to the components of the fishing brake 1 which was heretofore described with respect to FIGS. 1-8 are designated by the same reference numerals in the 101-199 series, respectively. In some embodiments, the fishing brake 101 may be particularly adapted for fishing lures 31 (FIG. 12) with a fishing weight 32 having a weight of from about 3/16 oz. to about 7/16 oz. The fishing brake 101 may have substantially the same design as the fishing brake 1, except the upper mouth edge 107 and the lower mouth edge 108 of the brake mouth 5 on the fishing brake body 2 may be generally flush with the flotation chamber side wall 121 of the flotation chamber 120 and the weighted chamber side wall 113 of the weight chamber 112. Application of the fishing brake 101 may be as was heretofore described with respect to the fishing brake 1 in FIGS. 9-14.

Referring next to FIGS. 21-24 of the drawings, still another illustrative embodiment of the fishing brake is generally indicated by reference numeral 201. In the fishing brake 201 in FIGS. 21-24, components which correspond to the components of the fishing brake 1 which was heretofore described with respect to FIGS. 1-8 are designated by the same reference numerals in the 201-299 series, respectively. The weighted chamber 212 may extend between the fishing brake body 202 and the flotation chamber 220. The weighted chamber 212 may include a weighted chamber side wall 213 which extends between the brake body wall 203 and the flotation chamber side wall 221 and may be generally cylindrical. At least one weighted chamber water opening 216 may extend through the weighted chamber side wall 213.

Application of the fishing brake 201 may be as was heretofore described with respect to the fishing brake 1 in FIGS. 9-14. Water enters the weighted chamber 212 through the weighted chamber water opening or openings 216 and weights the fishing brake 201 in the water body 36 such that the fishing brake body 202 and the weighted chamber 212 are completely submerged and the flotation chamber 220 is partially submerged beneath the water body 36 after casting of the fishing lure 31.

Figure 25:
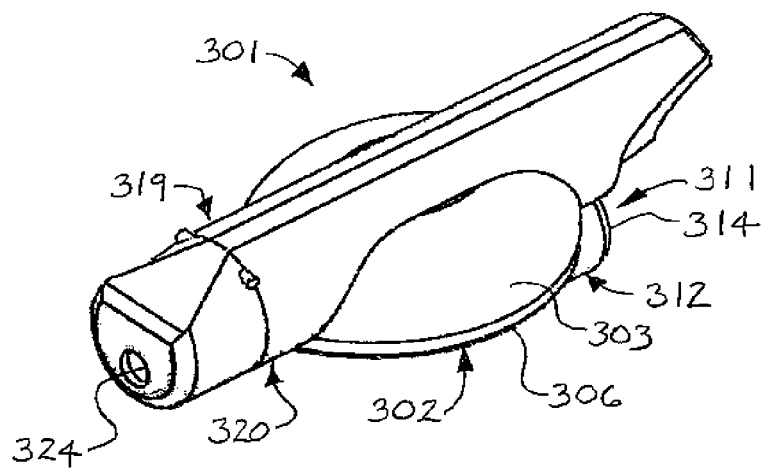
FIG. 25 is a perspective view of still another alternative illustrative embodiment of the fishing brake.
Figure 26:
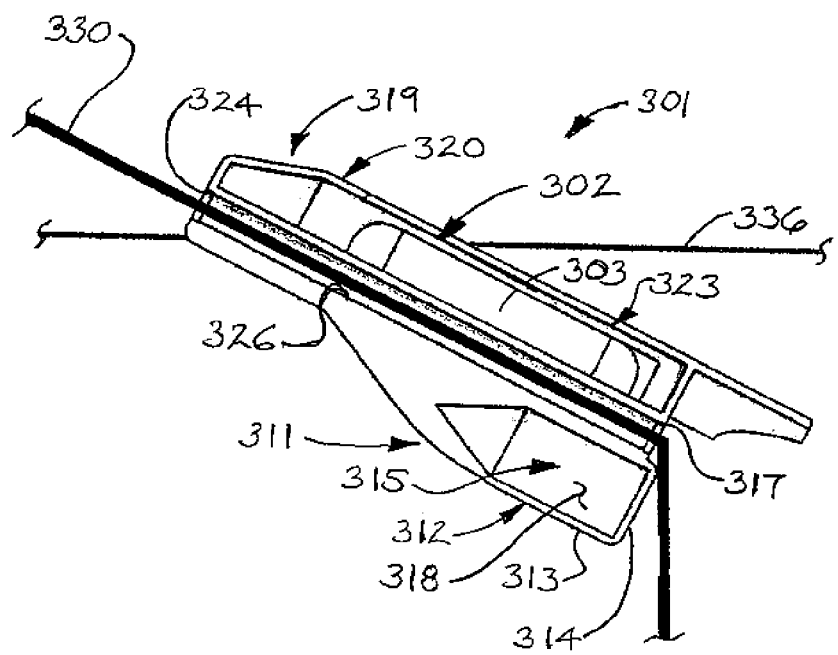
FIG. 26 is a sectional view of the fishing brake illustrated in FIG. 25, in typical application of the fishing brake.

Referring next to FIGS. 25 and 26 of the drawings, yet another illustrative embodiment of the fishing brake is generally indicated by reference numeral 301. In the fishing brake 301 in FIGS. 25 and 26, components which correspond to the components of the fishing brake 1 which was heretofore described with respect to FIGS. 1-8 are designated by the same reference numerals in the 301-399 series, respectively. The flotation chamber 320 may extend substantially the entire length of the fishing brake 301. Thus, the fishing brake body 302 may be contained within the flotation chamber interior 323 of the flotation chamber 320. The weighted chamber 312 may extend forwardly from the flotation chamber 320. The weighted portion fishing line opening 317 and the flotation portion fishing line opening 324 may be provided at opposite ends of the fishing brake 301. A fishing line bore 326 which accommodates the fishing line 330 may establish communication between the weighted portion fishing line opening 317 and the flotation portion fishing line opening 324.

Application of the fishing brake 301 may be as was heretofore described with respect to the fishing brake 1 in FIGS. 9-14. Water may enter the weighted chamber interior 315 of the weighted chamber 312 through one or more weighted chamber water openings (not illustrated) and weights the fishing brake 201 in the water body 36 (FIG. 12) such that the fishing brake body 302 and the weighted chamber 312 are completely submerged and the flotation chamber 320 is partially submerged beneath the water after casting of the fishing lure 31. The fishing brake 301 may assume a tilted orientation in the water body 336, as illustrated in FIG. 26.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A fishing brake for a fishing line, comprising:
    a generally concave fishing brake body having a brake interior and a brake mouth forming an exterior opening communicating with the brake interior;
    a buoyant flotation portion carried by the fishing brake body;
    a first fishing line opening extending through the flotation portion; and
    a second fishing line opening in the brake body at the brake mouth, the second fishing line opening disposed in alignment or registration with the first fishing line opening through the brake interior of the fishing brake body;
    whereby an operator is capable of slowing or braking retrieval of an attached fishing lure and said fishing lure is maintained at a desired depth.

2. The fishing brake of claim 1 wherein the fishing brake body comprises a generally cup-shaped or hemispherical brake body wall.

3. The fishing brake of claim 1 wherein the flotation portion comprises a flotation chamber having a flotation chamber interior and a buoyant medium contained in the flotation chamber interior.

4. The fishing brake of claim 3 wherein the buoyant medium comprises air.

5. The fishing brake of claim 1 wherein the brake mouth is tapered.

6. The fishing brake of claim 1 further comprising at least one brake body water opening in the fishing brake body, the at least one brake body water opening communicating with the brake interior.

7. The fishing brake of claim 1 wherein the fishing brake body is contained within the flotation chamber.

8. A fishing brake for a fishing line, comprising:
    a generally concave fishing brake body having a brake interior and a brake mouth forming an exterior opening communicating with the brake interior, the brake mouth having a pair of generally curved side mouth edges, an upper mouth edge and a lower mouth edge extending between the side mouth edges;
    a buoyant flotation portion carried by the fishing brake body;
    a weighted portion carried by the fishing brake body;
    a first fishing line opening extending through the flotation portion; and
    a second fishing line opening in the brake body at the brake mouth, the second fishing line opening disposed in alignment or registration with the first fishing line opening through the brake interior of the fishing brake body;
    whereby an operator is capable of slowing or braking retrieval of an attached fishing lure and said fishing lure is maintained at a desired depth.

9. The fishing brake of claim 8 wherein the fishing brake body comprises a generally cup-shaped or hemispherical brake body wall.

10. The fishing brake of claim 8 wherein the flotation portion comprises a flotation chamber having a flotation chamber interior and a buoyant medium contained in the flotation chamber interior.

11. The fishing brake of claim 10 wherein the buoyant medium comprises air.

12. The fishing brake of claim 8 wherein the brake mouth is tapered.

13. The fishing brake of claim 8 wherein the weighted portion comprises a weighted chamber having a weighted chamber interior and a weighted medium contained in the weighted chamber interior.

14. The fishing brake of claim 13 further comprising at least one weighted chamber water opening in the weighted chamber and communicating with the weighted chamber interior, and wherein the weighted medium comprises water.

15. The fishing brake of claim 8 wherein the weighted portion is between the fishing brake body and the flotation chamber.

16. A fishing brake for a fishing line, comprising:
- a generally concave fishing brake body including a generally cup-shaped or hemispherical brake body wall having a brake interior, a brake mouth forming an exterior opening communicating with the brake interior and at least one brake body water opening in the brake body wall and communicating with the brake interior, the brake mouth having a pair of generally curved side mouth edges, an upper mouth edge and a lower mouth edge extending between the side mouth edges;
- a buoyant flotation portion including a flotation chamber having a flotation chamber side wall carried by the fishing brake body wall at a first end of the fishing brake body, a flotation chamber end wall carried by the flotation chamber side wall, a flotation chamber interior and air in the flotation chamber interior;
- a weighted portion including a weighted chamber having a weighted chamber side wall carried by the fishing brake body wall at a second end of the fishing brake body, a weighted chamber end wall carried by the weighted chamber side wall, a weighted chamber interior and at least one weighted chamber water opening in the weighted chamber side wall and communicating with the weighted chamber interior;
- a first fishing line opening extending through the flotation portion; and
- a second fishing line opening in the brake body at the brake mouth, the second fishing line opening disposed in alignment or registration with the first fishing line opening through the brake interior of the fishing brake body.

17. The fishing brake of claim 16 wherein the brake mouth is tapered.

* * * * *